(12) United States Patent
Glomset

(10) Patent No.: US 7,533,874 B2
(45) Date of Patent: May 19, 2009

(54) OXYGENATING NOZZLE

(75) Inventor: Karsten Glomset, Alesund (NO)

(73) Assignee: AGA AB, Lidingo (SE)

( * ) Notice: Subject to any disclaimer, the term of this patent is extended or adjusted under 35 U.S.C. 154(b) by 0 days.

(21) Appl. No.: 11/132,463

(22) Filed: May 18, 2005

(65) Prior Publication Data
US 2005/0275119 A1    Dec. 15, 2005

(30) Foreign Application Priority Data
May 21, 2004   (NO) .................................. 20042102

(51) Int. Cl.
*B01F 3/04*         (2006.01)
(52) U.S. Cl. .................................. 261/76; 261/DIG. 75
(58) Field of Classification Search .................... 261/76, 261/77, DIG. 75
See application file for complete search history.

(56) References Cited

U.S. PATENT DOCUMENTS

| 285,822 | A | * | 10/1883 | Korting | 261/76 |
| 366,169 | A | * | 7/1887 | Hyatt | 417/174 |
| 393,488 | A | * | 11/1888 | Schutte | 261/76 |
| 456,828 | A | * | 7/1891 | Korting | 261/76 |
| 801,641 | A | * | 10/1905 | Boetcher | 417/174 |
| 816,043 | A | * | 3/1906 | Schutte | 261/76 |
| 847,010 | A | * | 3/1907 | Koerting | 261/76 |
| 2,100,185 | A | | 11/1937 | Engstrand | |
| 3,853,271 | A | | 12/1974 | Freshour et al. | |
| 4,474,477 | A | * | 10/1984 | Smith et al. | 366/165.5 |
| 4,743,405 | A | * | 5/1988 | Durao et al. | 261/76 |
| 5,173,030 | A | | 12/1992 | Heimhard et al. | |
| 5,591,328 | A | | 1/1997 | Bodnaras | |
| 5,935,490 | A | * | 8/1999 | Archbold et al. | 261/76 |
| 6,237,897 | B1 | * | 5/2001 | Marina | 261/64.1 |
| 2004/0113288 | A1 | * | 6/2004 | Korzeniowski | 261/76 |

FOREIGN PATENT DOCUMENTS

| DE | 455 957 | 1/1928 |
| FR | 2 301 289 | 9/1976 |
| NL | 7 116 127 | 5/1973 |

OTHER PUBLICATIONS

Chilean Search Report (Application No. 1129-05 filed Dec. 5, 2005).
European Search Report for European Application No. 05076207.9, mailed Mar. 30, 2008.

* cited by examiner

*Primary Examiner*—Scott Bushey
(74) *Attorney, Agent, or Firm*—Morgan & Finnegan, L.L.P.

(57) ABSTRACT

The present invention relates to a nozzle unit for the supply of gas into a liquid comprising two or more annular nozzles one after the other in the direction of flow. The nozzles are angled to give a restriction in the direction of flow, and each nozzle overlaps the following nozzle. Each nozzle has one or more apertures for the supply of gas at the overlap.

12 Claims, 4 Drawing Sheets

OXYGENATING NOZZLE

The present invention relates to a nozzle element for the injection of gas into a liquid.

The present invention is an arrangement for increasing the capacity for dissolving a gas in a liquid, for example for dissolving of oxygen in water in an oxygenation cone under pressure. The pressurised oxygenation cone can for example be mounted in a fish hatchery.

At hatcheries it is important that the content of dissolved oxygen in the water is kept high. Nozzles used today are not able to give a sufficient level of dissolved oxygen. Because the solubility of gases in water is reduced by increasing the temperature while the oxygen need of the fish is increasing at high temperatures, there is a particularly great need for oxygen in warm periods. Increasing the capacity of oxygen dissolvers is therefore highly useful for the fish farmer. In addition, most of the fish hatcheries produce more fish per liter water than the installation originally was dimensioned for. The amount of water is therefore a limiting factor of the installation. A better utilisation of the water, a higher consumption of the oxygen and an improved dissolving capacity are therefore required.

Most hatcheries use pressurised oxygen dissolvers with a working pressure of 1-4 bars. By small amounts of water, it is normal to let all of the water flow go through the dissolver, but most commonly there is an outlet leading a part of the flow from the main pipe to a booster pump which pressurises the dissolver. The oxygenated water is thereafter led back to the main pipe where it is mixed with untreated water. Most dissolving systems have an efficiency close to 100% using approximately 1.8-2.0 kWH per kilo $O_2$ at maximum dose, dependent upon the choice of pump. Injectors in combination with pressurised $O_2$ dissolvers are not common in Norway. The injectors which have been used have given a relatively small increase in the capacity, a great loss of pressure, and increased consumption of energy.

U.S. Pat. No. 5,935,490 describes an apparatus for dissolving a gas into a fluid stream. The apparatus has an annular body disposed to define a throttle in the fluid stream. The body has a plurality of inwardly facing apertures in communication with a supply of pressurised gas. Each of the apertures defines a localised injection point for the pressurised gas into the fluid stream. The annular body has a progressively reduced cross-sectional area, such that the resultant velocity and pressure differentials enhance dissolution of gas in the fluid.

Impurities in the water can cause clogging of the canals for the gas supply, especially when supplying small amounts of gas or at a low gas pressure. The decreasing cross-sectional area of the apertures for gas supply results in that the pressure energy is converted into kinetic energy. The water pressure (counter pressure to the gas pressure) will therefore be at the lowest at the smallest cross-sectional area. At upstream and horizontal installations, the pressure difference will be considerable and results in the gas emanating mainly through the canals at the smallest cross-sectional area.

FR 2301289 describes a mixture of two fluids, where one fluid flows as a film and the other in the shape of a plurality of jets. The jets get in contact with the first fluid at an angle and a pressure depending on the properties of the fluids, and at such an angle that the second fluid is dispersed into the first fluid. The film of the first fluid can be cylindrical or conical.

According to the present invention, the nozzle noses point downwards in the direction of the flow and the nozzle noses cover the gas supplying apertures. This reduces the danger of clogging the apertures due to impurities in the water. Each nozzle encircles the cross sectional area and will therefore give a larger area for gas supply. The larger area for gas supply causes the gas pressure and water pressure at the point of supply to be approximately equal, and this and the pointed nozzles cause very few gas bubbles to be generated. Small bubbles have a large surface relative to mass and will therefore give a relatively rapid mass transportation from gas to liquid.

SUMMARY OF THE INVENTION

The present invention relates to a nozzle unit for dispersion of gas in a liquid comprising two or more annular nozzles arranged one after the other in the direction of flow. The nozzles are angled to give a narrowing passage in the direction of flow and each nozzle is overlapping the following nozzle. Each nozzle has one or more apertures for the supply of gas at the overlap.

The nozzle unit can be arranged in a pipe and on the rear side of the nozzle there can be an annular space for the supply of the gas which is open to the apertures. From the annular space and out through the pipe wall there can be one or more bores to a nipple for gas supply. When installing in a pipe there can be on the inside of the pipe a restriction of the inner circumference of the pipe and this restriction can be rounded. The inner side of the pipe can be expanded back to the original diameter of the pipe at the outlet side. In each nozzle unit, there can be arranged one or more outlets for static pressure measurement and one or more outlets for dynamic pressure measurement.

DESCRIPTION OF THE DRAWINGS

FIG. 3 shows details of the nozzle unit in a pipe arrangement according to FIG. 2a.

DETAILED DESCRIPTION OF THE INVENTION

Figure 1:
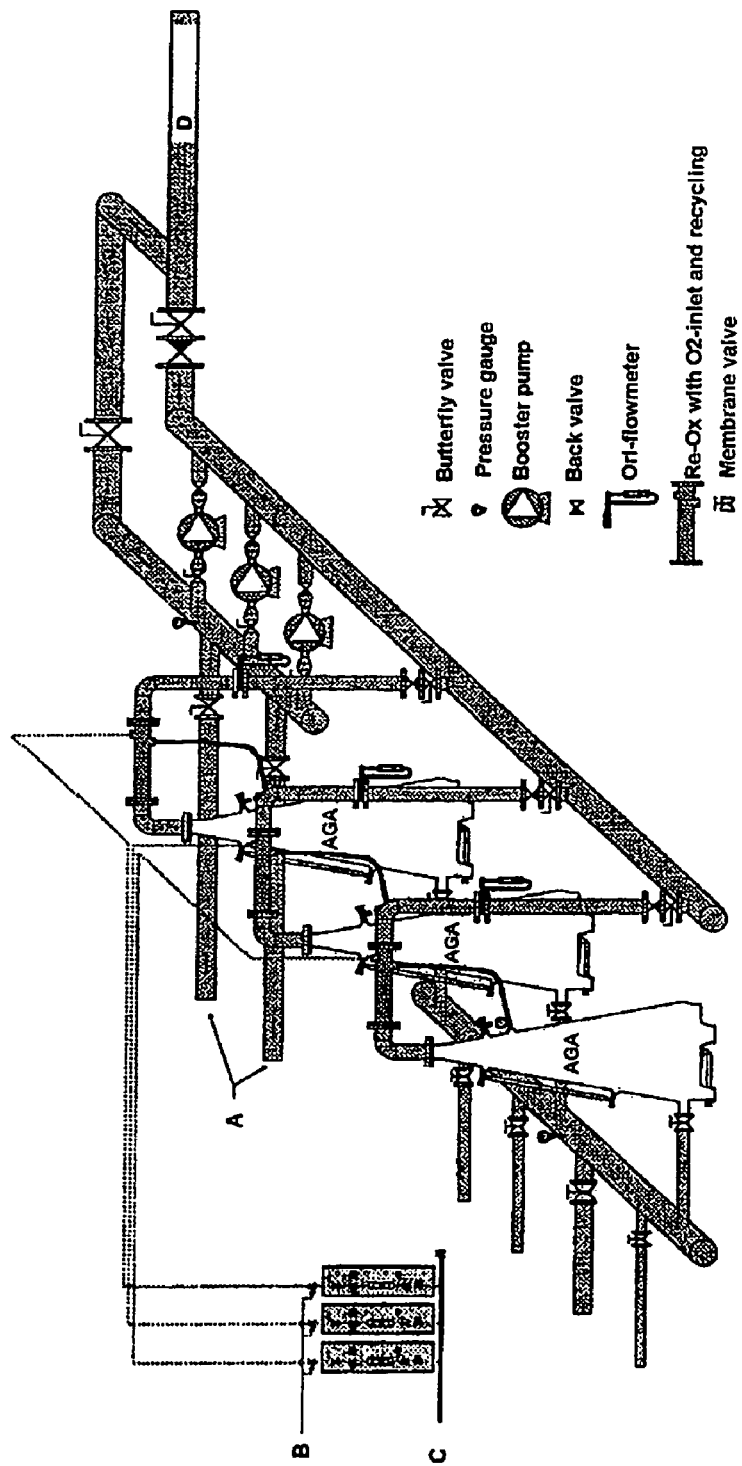
FIG. 1 shows a principle view of the arrangement of the present invention at the inlet to oxygenation cones.

The present invention relates to a nozzle unit for the injection of gas in a liquid flow. The arrangement can for example be mounted on any pipe transporting liquid and with a need for the supply of gas, for example on the pipe supply to a basin for the farming of fish, on the pipe after a circulation pump on a boat for live fish transportation, on the pipe after a circulation pump for vehicles for live fish transportation, on the pipe after a circulation pump on a container or other arrangement for live fish transportation, or on pressurised dissolvers for increasing the oxygenating capacity.

A part of the total water amount provided to an installation or a section of water is pressurised with pumps or head pressure and is led through the oxygenating cone. This part flow is "superoxygenated", i.e. oxygen is added under pressure so that the water gets several hundred per cent of saturation as compared to atmospheric equilibrium. This water is led back and mixed again with the main stream and thereafter led out to distribution to each basin. The content of oxygen in the main water stream will be within the tolerance area of the fish for oxygen content in water and the content can be reduced according to the need of the fish.

When water is put under pressure the solubility of gases will increase. This is the main principle for dissolving of oxygen in a cone. The cone has a conical shape. Water and oxygen is added in the inlet pipe which leads to the top of the cone. The flow velocity of the water is reduced downwards in the cone as the cross-section increases. Some oxygen will dissolve quickly and some oxygen will form bubbles in the water. The buoyancy of the oxygen bubbles in the water will be overcome by the downwards flow of the water. Bubbles of oxygen will be standing in the water flow in the cone and dissolve after some time. Some oxygen will form bubbles so big that they will ascend to the top of the cone and form a gas pillow over the water surface. Water with dissolved oxygen will flow downwards in the cone and out of the outlet at the bottom. This way the discharged water will only contain dissolved oxygen and not oxygen in the form of bubbles. At the top of the cone there will standing a volume of undissolved oxygen gas. This volume will depend on the amount of oxygen being added to the water and the amount which is dissolved and follow the water flow out of the cone. The gas volume at the top of the cone will usually not exceed one third of the height between the inlet and the outlet of the cone.

Since the solubility of gases in water is reduced at increased temperatures while the oxygen need in fish increases at increasing temperatures, there is a particularly great need for oxygen in warm periods. The ability to increase the capacity of oxygen dissolvers is therefore very useful for a fish farmer. In addition, most fish hatcheries produce more fish per liter of water than the installation was dimensioned for. The amount of water is therefore often a limiting factor of the installation. This requires an improved use of the water, a higher consumption of oxygen and an improved dissolving capacity.

An oxygen cone without a nozzle unit according to the present invention has a dissolving capacity of 52% of the theoretically possible dissolvation. The dissolving ratio of the cone according to the present invention is more than 99%, meaning that 99% of the oxygen is dissolved before it flows out from the cone and into the pipe grid. These figures assume that the cone is run within its range regarding pressure, water flow and gas flow.

The nozzle unit according to the present invention comprises two or more annular nozzles arranged one after the other in the direction of flow. The nozzles are angled to give a narrowing passage in the direction of the flow and each nozzle is overlapping the following nozzle. Each nozzle has one or more apertures for the supply of gas at the overlap. The nozzle may have a nose at the overlap, and this nose preferably has an angle between of 3° and 45°, most preferably 33°. The nozzles can be made from any material, but preferably from POM.

In one embodiment the nozzle unit is arranged in a pipe. The pipe can be made from any material, but preferably from PEH. On the rear side of the nozzle there can be an annular space for the supply of gas which is open to the apertures. From the annular space and out through the pipe wall there can be one of more bores to a nipple for the supply of gas. At the installation in the pipe there can be on the inside of the pipe a restriction of the inner circumference of the pipe, and the angle of the restriction of the inlet piece can be from 5° to 15°, preferably 9°. This restriction can be rounded. The inside of the pipe can be expanded to the original diameter of the pipe at the outlet side, and the restriction on the outlet unit is from 2° to 15°, preferably 4°. In the nozzle unit there can be arranged one or more outlets for measurement of static pressure and one of more outlets for measurement of dynamic pressure.

In one embodiment of the present nozzle unit an outlet for the measurement of static and dynamic pressures is arranged in order to control the amount of water. These outlets can be connected to a differential pressure gauge and/or through pressure sensors to a digital display and/or to a computer for displaying and monitoring.

In one embodiment the present unit has a recycling device based on the injector principle. Gas which has not been dissolved can be led back to the unit by means of differential pressure. In application where recycling is not relevant, gas can be led through the recycling nozzles and thereby increasing the area of gas supply.

One aspect that distinguishes the unit from known injectors is the pointed nozzles with outlets in the direction of the flow which can generate very small bubbles also as a consequence of the high number of nozzles/the large area. Another advantage of the present nozzle unit is the low loss of pressure/consumption of energy. The unit is mounted horizontally and dimensioned for 1000 litre/minute and is adapted to a AGA cone 60 $m^3/h$ with a working pressure of 3.8 bar, giving a measured pressure drop over the unit, without dosing the oxygen of 83 mbar (0.08 bar). An oxygen dose of 8.2 kg/h resulted in a loss of pressure of 103 mbar (0.10 bar). With the nozzle unity according to the present invention the dimensioning water flow rate of the cone can be increased with 25% and still maintain a degree of effectiveness close to 100%.

Figure 2A:
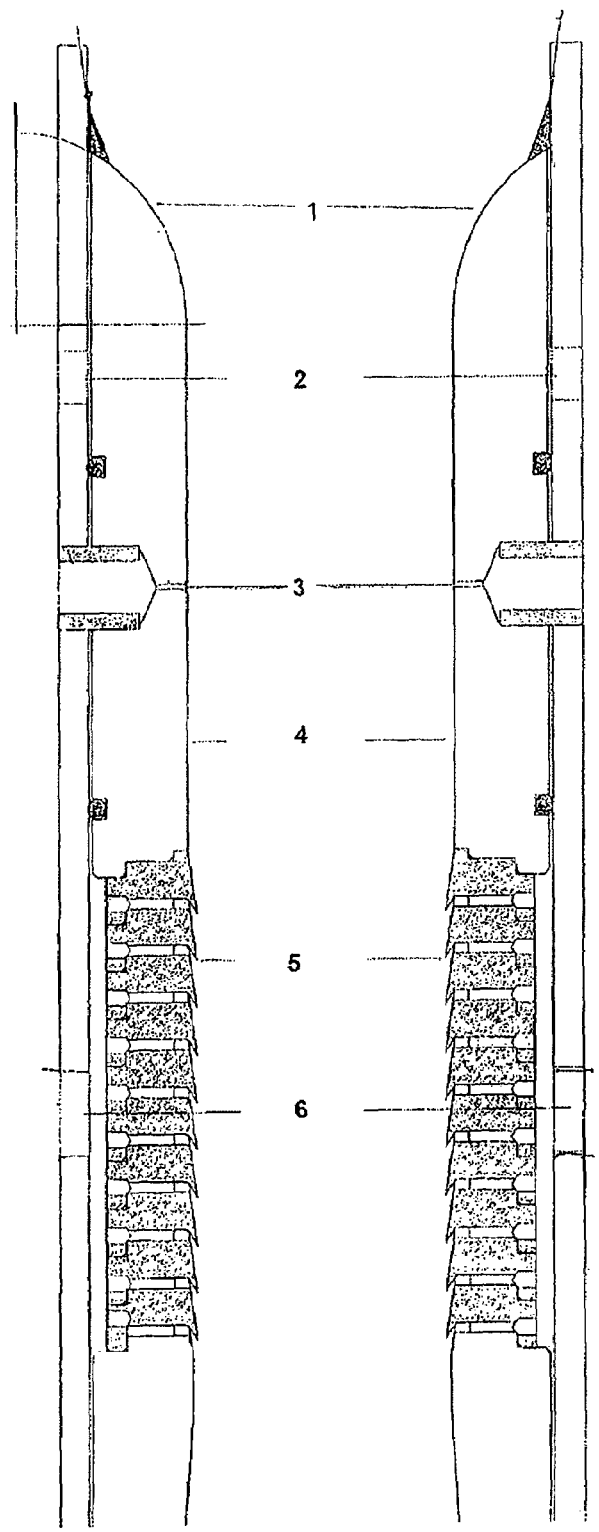
FIGS. 2a and 2b show the nozzle unit arranged in a pipe with an inlet piece for the pipe unit and an outlet piece, respectively.
Figure 2B:
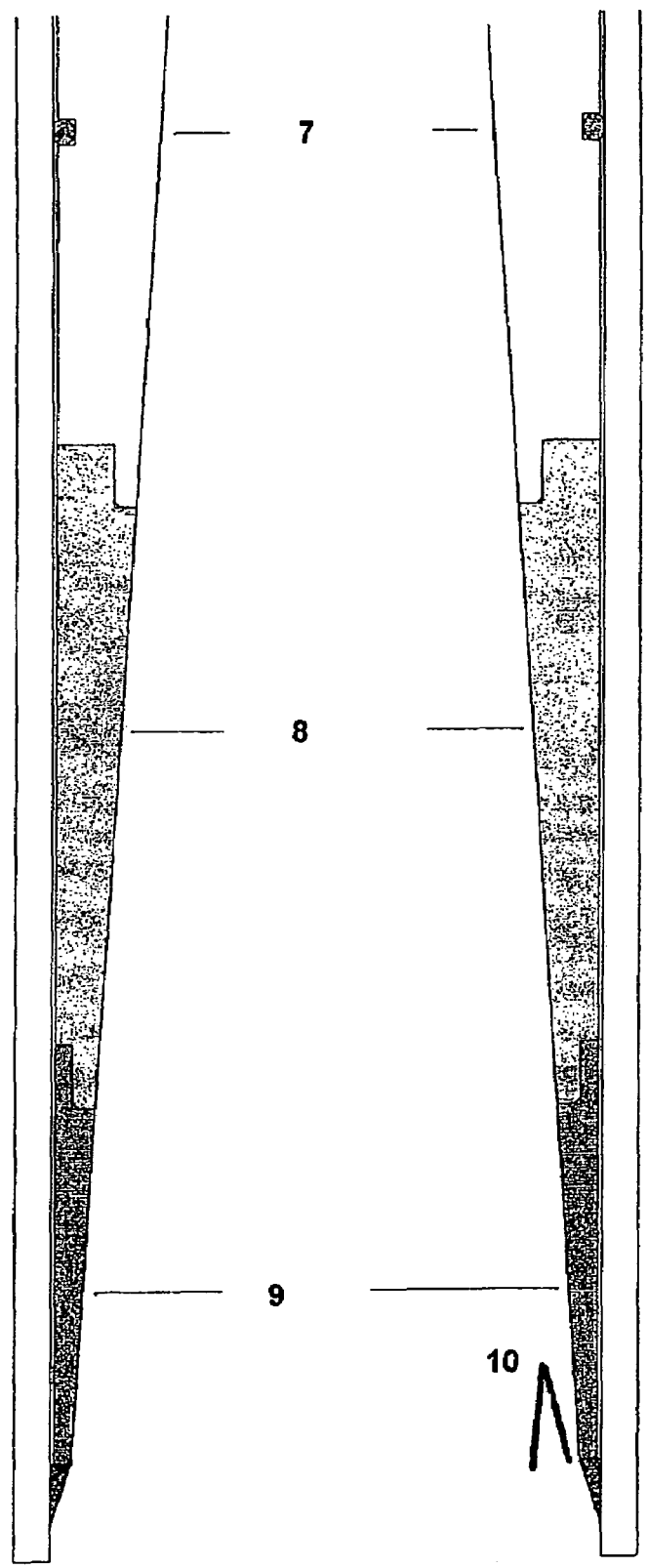
Figure 3:
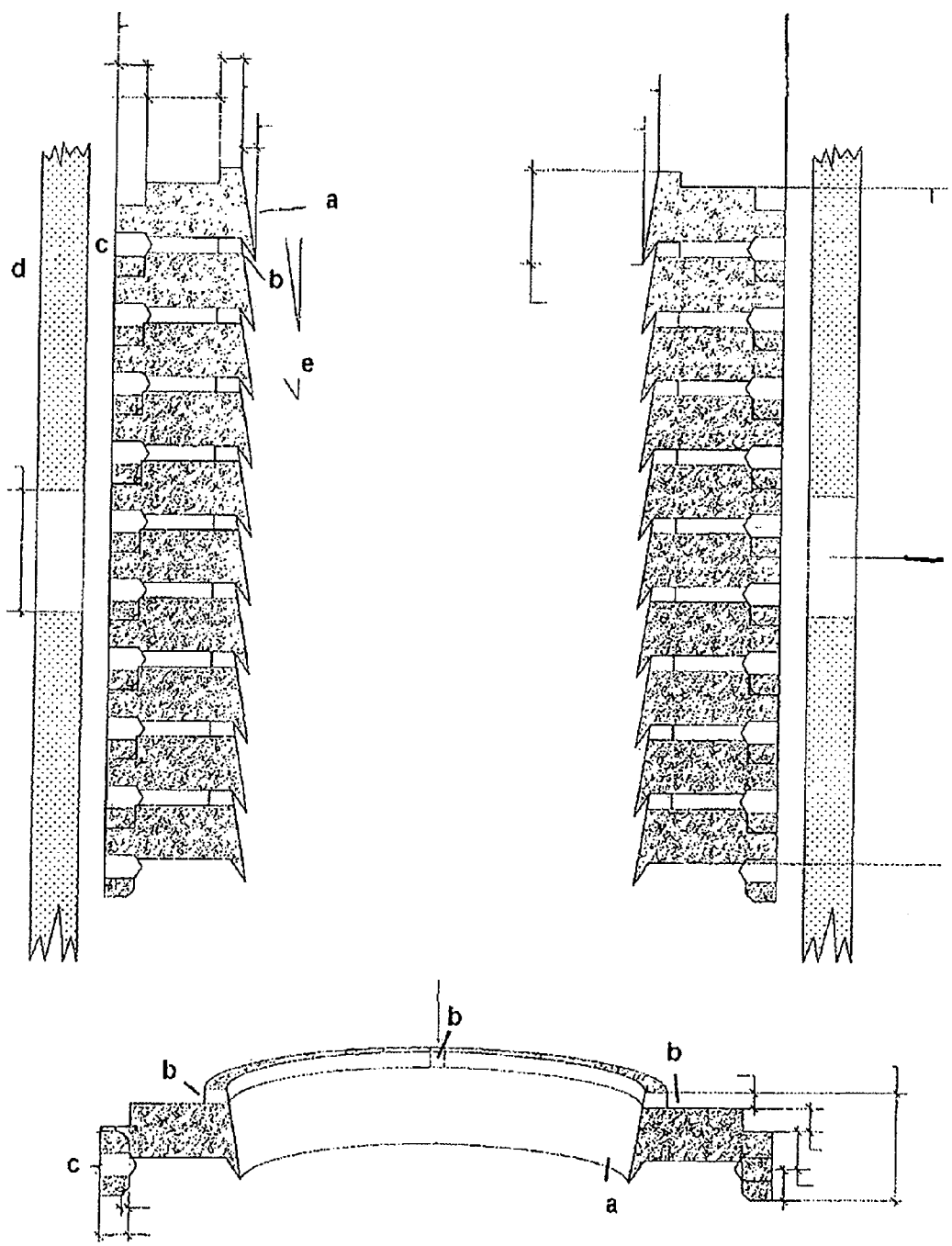

The nozzle unit according to the present invention is flanged into the pipeline entering the cone. With reference to the FIGS. 2a, 2b and 3, the present unit is a pipe (d) of the same dimension as the original pipe leading into the cone. The length of the unit depends on the size of the cone. On the inside 4 of the pipe there is a restriction 1 with a free passage of 56% of the total area of the pipe, the restriction 1 being rounded to reduce the loss of pressure by not making turbulence. The restriction then goes back 7, 8, 9 in the direction of the flow to the original free passage at an angle 10. At the inlet section there is one or more outlets for static pressure measurement 2 and one or more outlets for dynamic pressure measuring 3 to measure the difference in pressure and to calculate the flow rate of water. There can be one or more nozzles 5, preferably between 5 and 15, more preferably 10. Each nozzle has one or more apertures (b) for the supply of gas at the overlap. There are two bores 6 in the unit for the supply of "new" oxygen and two bores 6 for recycled gas from the top of the cone. The nozzles are designed to be arranged facing each other and are angled as a restriction (a) with respect to the direction of the flow. This is done in order for the water flow to be led towards the next nozzle and entrain the oxygen bubble. Each nozzle is pointed with an angle (e) towards the next nozzle. This is done to obtain small bubbles which are easily detached from the edge. On the backside of the nozzles towards the pipe wall (d) there is an annular space (c) and a bore 6 to a nipple. Here the oxygen is added and is distributed to the nozzles. The oxygen supply from the recycling arrangement is added through a tube which is attached to the ventilating wall on the top of the cone. The system is arranged so that when the static pressure is transformed to kinetic energy at the restriction in the nozzle arrangement according to the invention, there will be a drop of pressure in the nozzle arrangement. There will be an underpressure, and gas from the gas pocket in the cone will be pressed back into the water flow through the nozzle unit.

The technology behind the nozzle arrangement is to utilize differences in pressure to recycle gas from the gas volume at top of the cone back into the inlet water which is reenters the cone. Tests show that the use of a nozzle arrangement according to the invention leads to a 50% increase in capacity of the cone, i.e. it gives a capacity of about 78% of theoretical capacity. Since most cones pressurise the water by means of pumps, energy saving is an important advantage. With the present invention, the amount of dissolved energy is increased for the same level of energy consumption or the dissolving capacity can be maintained at a lower energy consumption.

The system is arranged so that when the static pressure is transformed into kinetic energy in the restriction in the nozzle arrangement according to the invention, there will be a drop of pressure in the nozzle arrangement. There will be an underpressure and gas from the gas pocket in the cone will be forced back into the water flow through the nozzle unit. For example, at 1000 l/min water which flows with a velocity of 2 m/s through the pipe ahead of the nozzle unit and with a pressure of 3.6 bar, the flow velocity of the water at the point where the recycled oxygen is supplied will be 8 m/s and the pressure will be 3.2 bar. The cone has a pressure of 3.8 bar, i.e. the difference in pressure is 0.6 bar. The oxygen will be forced upwards and make new contact with the water and thereby increase the mass transportation and oxygenating capacity.

EXAMPLE

The technique behind the nozzle arrangement is to utilize pressure differences to recycle gas from the gas volume on top of the cone back into the inlet water which is reentering the cone. On the basis of a cone having a capacity of 60 m$^3$/h water, 3.8 bar pressure and temperature of 10° C. there can be dosed an amount of 6.25 kg/h oxygen. Tests have been done at the AGA test centre on the cone with a flow rate and pressure as described. The tests show that the use of the nozzle arrangement according to the invention increases the capacity of the cone with up to 9.7 kg, i.e. a 50% increase, which gives a capacity of about 78% of theoretical capacity. A hatchery which has to increase their oxygenating capacity from 2 to 3 cones can choose to install the present invention on their cones and thereby obtain the same total capacity. In addition, the energy consumption per kilo dissolved oxygen is substantially reduced.

The invention claimed is:

1. A nozzle unit for the distribution of a gas into a liquid under pressurized conditions comprising two or more annular nozzles arranged within a pipe one after the other in the direction of flow, the two or more annular nozzles being angled to provide a restriction passage in the direction of the flow, each of the two or more annular nozzles overlapping another one of the two or more annular nozzles and each of the two or more annular nozzles having one or more apertures substantially perpendicular to the direction of flow for the supply of pressurized gas at the overlap, each aperture formed between the bottom surface of the overlapping annular nozzle and the top surface of the following annular nozzle as a passageway for transporting gas to the liquid flow, wherein the backside of the two or more annular nozzles and the inside of the pipe form an annular space for the supply of gas which is open toward the apertures.

2. A nozzle unit according to claim 1, wherein from an annular space and out through a wall of the pipe there are one or more bores to a nipple for the supply of gas.

3. A nozzle unit according to claim 1, wherein on an inside of the pipe there is a restriction of the inner circumference of the pipe.

4. A nozzle unit according to claim 1, wherein a restriction in an inlet section of the pipe is rounded.

5. A nozzle unit according to claim 1, wherein the inside diameter of the pipe is expanded in an outlet section of the pipe back to the original diameter of the pipe.

6. A nozzle unit according to claim 1, wherein an inlet section of the nozzle unit has one or more outlets for static pressure measurement and one or more outlets for kinetic pressure measurement.

7. A nozzle unit according to claim 1, wherein the nozzle unit has 5 to 15 annular nozzles.

8. A nozzle unit according to claim 1, wherein the angle formed in an inlet section of the pipe between an inside surface of one of the two or more annular nozzles and the direction of flow is between 5° and 15°.

9. A nozzle unit according to claim 1, wherein the overlap of one of the two or more annular nozzles with another one of the two or more annular nozzles forms an edge, wherein the edge forms an angle between 3° and 45° with an inside surface of one of the two or more annular nozzles.

10. A nozzle unit according to claim 5, wherein the angle formed between the inside surface of the outlet section of the pipe and the direction of flow is between 2° and 15°.

11. A nozzle unit according to claim 1, wherein the nozzles are made of POM.

12. A nozzle unit according to claim 1, wherein the pipe where the nozzles are arranged is made of PEH.

* * * * *